United States Patent
Chung et al.

(10) Patent No.: US 12,309,183 B2
(45) Date of Patent: May 20, 2025

(54) ATTACK DETECTION APPARATUS AND METHOD BASED ON MEASUREMENT OF NETWORKING BEHAVIOR ABNORMALITIES IN SYMBOLIC SPACES

(71) Applicant: ELECTRONICS AND TELECOMMUNICATIONS RESEARCH INSTITUTE, Daejeon (KR)

(72) Inventors: Byung-Ho Chung, Daejeon (KR); Hyeok-Chan Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 252 days.

(21) Appl. No.: 18/057,056

(22) Filed: Nov. 18, 2022

(65) Prior Publication Data

US 2023/0208866 A1    Jun. 29, 2023

(30) Foreign Application Priority Data

Dec. 29, 2021   (KR) ........................ 10-2021-0190598

(51) Int. Cl.
H04L 9/40   (2022.01)

(52) U.S. Cl.
CPC ...... *H04L 63/1425* (2013.01); *H04L 63/1416* (2013.01); *G06F 2221/033* (2013.01)

(58) Field of Classification Search
CPC .............. H04L 63/145; H04L 63/1425; H04L 63/1416; G06F 21/552
See application file for complete search history.

(56) References Cited

U.S. PATENT DOCUMENTS

| 6,769,066 B1 | 7/2004 | Botros |
| 10,007,789 B2 | 6/2018 | Kim et al. |

(Continued)

FOREIGN PATENT DOCUMENTS

| KR | 10-2017-0108330 A | 9/2017 |
| KR | 10-2018-0001941 A | 1/2018 |

OTHER PUBLICATIONS

Yang, Seong-Il, "Medical device network abnormal behavior detection engine," ETRI Documents, Dec. 9, 2021.

(Continued)

*Primary Examiner* — Olugbenga O Idowu

(57) ABSTRACT

Disclosed herein are an attack detection apparatus and method based on measurement of networking behavior abnormalities in symbolic spaces. The attack detection method based on measurement of networking behavior abnormalities in symbolic spaces includes creating profiles based on a transmission address of a flow received from a network, measuring a behavior abnormality of a device corresponding to the transmission address of the flow on the network, and mapping the measured behavior abnormality to behavior symbols in symbolic spaces, generating a behavior symbol sequence pattern, in which the behavior symbols are sequentially connected, for each profile, and detecting presence or non-presence of an attack and a device associated with the attack based on an output of the abnormal behavior prediction model that receives the behavior symbol sequence pattern as input.

18 Claims, 10 Drawing Sheets

PETYA
RANSOMWARE

POWERGHOST
MALWARE

BADRABBIT
RANSOMWARE

(56) References Cited

U.S. PATENT DOCUMENTS

| | | |
|---|---|---|
| 2010/0284282 A1 | 11/2010 | Golie |
| 2018/0013773 A1* | 1/2018 | Valgenti .............. H04L 63/1416 |
| 2019/0207969 A1 | 7/2019 | Brown |
| 2021/0112090 A1* | 4/2021 | Rivera ................ H04L 63/1425 |
| 2021/0120027 A1 | 4/2021 | Dean |
| 2021/0126931 A1 | 4/2021 | Babu |
| 2021/0182397 A1 | 6/2021 | Karnik |

OTHER PUBLICATIONS

Kwon, Hyeok-Chan et al., "Security Technology Trends to Prevent Medical Device Hacking and Ransomware," Electronics and Telecommunications Trends, Oct. 1, 2021.

"Preparing for Tensorflow developer certification (4)," Women's Techmaker, Jun. 22, 2020.

* cited by examiner

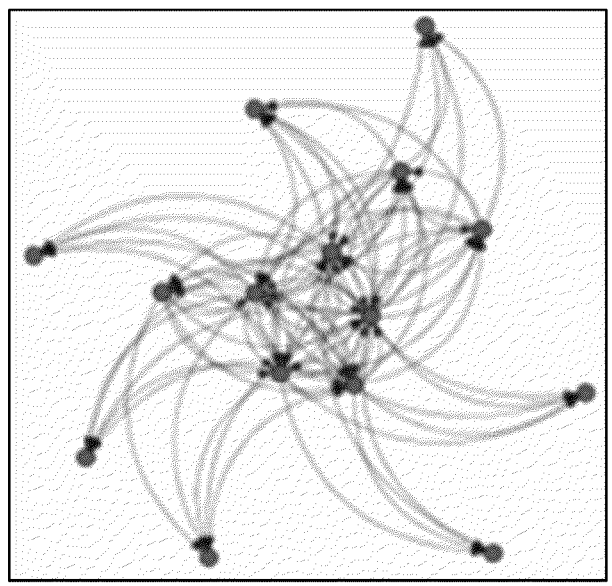
CLEAN[NORMAL]
FIG. 1
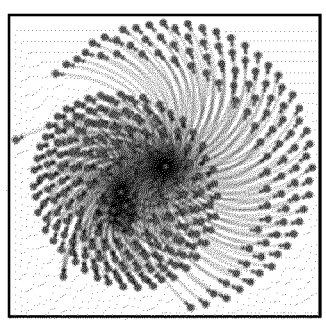 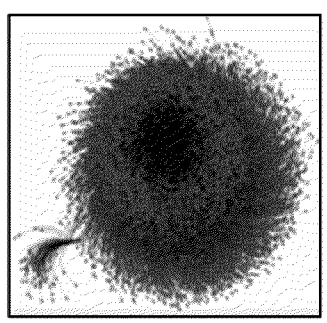 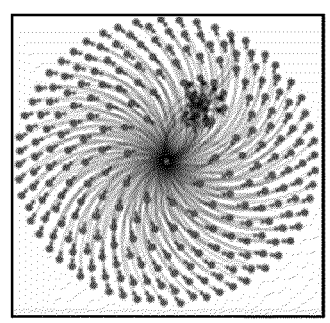
PETYA RANSOMWARE  POWERGHOST MALWARE  BADRABBIT RANSOMWARE
FIG. 2

| PROFILE ID (srcAddr_timewindow_tuple) | STATE (3D SYMBOLIC BEHAVIOR SEQUENCE) |
|---|---|

| PROFILE ID (srcAddr_timewindow_tuple) | STATE (3D SYMBOLIC BEHAVIOR SEQUENCE) | LABEL |
|---|---|---|

| INTER-FLOW ARRIVAL TIME DIFFERENCE(IFTD) | | a_Flow(Totbytes) | | | | | | | |
|---|---|---|---|---|---|---|---|---|---|
| | | SMALL SIZE < SST | | | MEDIUM SIZE < MST | | | LARGE SIZE >= MST | | |
| | | a_Flow(DURATION) | | | | | | | | |
| | | Shot< st | Mid.< mt | Long>=mt | Shot< st | Mid.< mt | Long>=mt | Shot< st | Mid.< mt | Long>=mt |
| <spt | STRONG PERIODICITY | A | B | C | D | E | F | G | H | — |
| <wpt | WEAK PERIODICITY | a | b | c | d | e | f | g | h | — |
| <wnt | WEAK NON-PERIODICITY | r | s | t | u | v | w | x | y | z |
| >=wnt | STRONG NON-PERIODICITY | R | S | T | U | V | W | X | Y | Z |
| =-1 | NO DATA OF LAST_TS OR LASTLAST_TS | 1 | 2 | 3 | 4 | 5 | 6 | 7 | 8 | 9 |

FIG. 8

ATTACK DETECTION APPARATUS AND METHOD BASED ON MEASUREMENT OF NETWORKING BEHAVIOR ABNORMALITIES IN SYMBOLIC SPACES

CROSS REFERENCE TO RELATED APPLICATION

This application claims the benefit of Korean Patent Application No. 10-2021-0190598, filed Dec. 29, 2021, which is hereby incorporated by reference in its entirety into this application.

BACKGROUND OF THE INVENTION

1. Technical Field

The following embodiments relate to technology for detecting ransomware attacks in a medical device network.

2. Description of the Related Art

Currently, in medical institutions at a university hospital level, about 8,000 to 30,000 medical devices are installed. Most of the medical devices are connected to a wired/wireless network and then operated in the form of the Internet of Medical Things (IoMT).

The threat of ransomware attacks targeting the medical devices, such as Conti, Ryuk, Petya, and Sodinokibi, have appeared as the most importance issue for hospital cyber security, but technical measures and security solutions for preventing such attacks are not sufficiently provided all around the world.

Security solutions to medical devices in hospitals having medical device availability and medical data privacy protection as issues are inefficient, and thus there is a great concern about undefined security-related problems.

Actually, in the United States, it is known that 600 or more hospitals were under ransomware attacks in 2020. Those ransomware attacks show attack patterns such as by infecting medical devices vulnerable to security, such as MRI scanners, and thereafter invading the inside of a hospital such as an Electronic Medical Record (EMR) and Picture Archiving and Communication System (PACS) server.

Ransomware attacks may be roughly divided into a first step of invading a device and illegally exploiting the authority to the device, a second step of causing ransomware to act on the device, and a third step of spreading ransomware attacks to a network by attempting to infect peripheral devices or to communicate with a command-and-control (C&C) server. Of these steps, the second step is an attack made at a device level, and the first step and the third step are attacks made at a network level.

Unfortunately, it is also impossible to detect ransomware acting on the device at the second step and respond to the detected ransomware. The reason for this is that, unlike a typical personal computer (PC), a medical device is a product that is specialized for a medical function and that is approved by a licensing institution such as FDA and then released, and thus it is practically impossible to install antivirus software or the like for security. That is, when antivirus software is executed on the medical device or when signatures generated in an encryption process, for example, called function relationships, file I/O patterns, malware similarity, etc., are collected so as to block attacks through a firewall or host Intrusion Prevention System (IPS), there is a great concern that an added security function will damage the availability of medical devices closely connected to the safety and life of a patient.

Due to these reasons, there is required technology for effectively detecting ransomware attack attempts at the network level corresponding to the first and third steps while guaranteeing the availability of medical devices, rather than at the device level.

SUMMARY OF THE INVENTION

An embodiment is intended to effectively detect attempts to make ransomware attacks on a medical device (IoMT device) at a network level, thus preventing the spread of ransomware attack attempts.

In accordance with an aspect, there is provided an attack detection apparatus based on measurement of networking behavior abnormalities in symbolic spaces, including memory configured to store at least one program and an abnormal behavior prediction model and a processor configured to execute the program, wherein the program is configured to perform creating profiles based on a transmission address of a flow received from a network, measuring a behavior abnormality of a device corresponding to the transmission address of the flow on the network, and mapping the measured behavior abnormality to behavior symbols in symbolic spaces, generating a behavior symbol sequence pattern, in which the behavior symbols are sequentially connected, for each profile, and detecting presence or non-presence of an attack and a device associated with the attack based on an output of the abnormal behavior prediction model that receives the behavior symbol sequence pattern as input.

The behavior abnormality may include, as a measurement indicator thereof, at least one of behavior periodicity, behavior familiarity, or behavior entropy or a combination thereof, and the program may be configured to perform, in mapping, mapping each of the behavior periodicity, the behavior familiarity, and the behavior entropy to a behavior symbol in a symbolic space.

The program may be configured to perform, in mapping, generating a behavior period symbol and a behavior frequency symbol based on a flow size, a flow duration, and an inter-flow arrival time difference (IFTD), and generating a behavior periodicity symbol by combining the behavior period symbol with the behavior frequency symbol.

The memory may be configured to further store a network familiarity model created in advance based on a network flow dataset in a normal state, and the program is configured to perform, in mapping, measuring behavior familiarity depending on whether at least one key value extracted from the flow is present in a network familiarity model dictionary, and mapping the measured behavior familiarity to a symbol.

The program may be configured to perform, in mapping, measuring a port scanning entropy and a target scanning entropy, mapping the port scanning entropy and the target scanning entropy to respective symbols, and generating an entropy symbol by combining the two mapped symbols with each other.

The program may be configured to perform, in generating the behavior symbol sequence pattern, generating a three-dimensional (3D) behavior symbol by combining a behavior periodicity symbol, a behavior familiarity symbol, and a behavior entropy symbol with each other, and adding the generated 3D behavior symbol to a behavior symbol sequence pattern of the corresponding profile.

The abnormal behavior prediction model may be pre-trained based on a training dataset in which the behavior symbol sequence pattern for each profile is labeled with a normal state or an abnormal state.

The program may be configured to further perform, in detecting, preprocessing the behavior symbol sequence pattern as input data of the abnormal behavior prediction model, and preprocessing may include converting the behavior symbol sequence pattern into a number list, padding the converted behavior symbol sequence pattern with zero such that a length of the converted behavior symbol sequence pattern becomes equal to that of a behavior symbol sequence pattern used as training data of the abnormal behavior prediction model, and embedding a word in a zero-padded behavior symbol sequence pattern and converting a word-embedded behavior symbol sequence pattern into an input data format of the abnormal behavior prediction model.

The program may be configured to perform, in detecting, acquiring a score from the abnormal behavior prediction model to which the behavior symbol sequence pattern is input, determining whether the score is equal to or greater than a predetermined threshold value, and when it is determined that the score is equal to or greater than the predetermined threshold value, detecting appearance of an attack and identifying at least one of an attacking device or an infected device, or a combination thereof based on the profiles.

In accordance with another aspect, there is provided an attack detection method based on measurement of networking behavior abnormalities in symbolic spaces, including creating profiles based on a transmission address of a flow received from a network, measuring a behavior abnormality of a device corresponding to the transmission address of the flow on the network, and mapping the measured behavior abnormality to behavior symbols in symbolic spaces, generating a behavior symbol sequence pattern, in which the behavior symbols are sequentially connected, for each profile, and detecting presence or non-presence of an attack and a device associated with the attack based on an output of the abnormal behavior prediction model that receives the behavior symbol sequence pattern as input.

The behavior abnormality may include, as a measurement indicator thereof, at least one of behavior periodicity, behavior familiarity, or behavior entropy or a combination thereof, and mapping the measured behavior abnormality may include mapping each of the behavior periodicity, the behavior familiarity, and the behavior entropy to a behavior symbol in a symbolic space.

Mapping the measured behavior abnormality may further include generating a behavior period symbol and a behavior frequency symbol based on a flow size, a flow duration, and an inter-flow arrival time difference (IFTD), and generating a behavior periodicity symbol by combining the behavior period symbol with the behavior frequency symbol.

Mapping the measured behavior abnormality may further include measuring behavior familiarity depending on whether at least one key value extracted from the flow is present in a network familiarity model dictionary, and mapping the measured behavior familiarity to a symbol, wherein the network familiarity model may be created in advance based on a network flow dataset in a normal state.

Mapping the measured behavior abnormality may further include measuring a port scanning entropy and a target scanning entropy, mapping the port scanning entropy and the target scanning entropy to respective symbols, and generating an entropy symbol by combining the two mapped symbols with each other.

Generating the behavior symbol sequence pattern may include generating a three-dimensional (3D) behavior symbol by combining a behavior periodicity symbol, a behavior familiarity symbol, and a behavior entropy symbol with each other, and adding the generated 3D behavior symbol to a behavior symbol sequence pattern of the corresponding profile.

The abnormal behavior prediction model may be pre-trained based on a training dataset in which the behavior symbol sequence pattern for each profile is labeled with a normal state or an abnormal state.

Detecting the presence or non-presence of the attack and the device may include preprocessing the behavior symbol sequence pattern as input data of the abnormal behavior prediction model, and preprocessing may include converting the behavior symbol sequence pattern into a number list, padding the converted behavior symbol sequence pattern with zero such that a length of the converted behavior symbol sequence pattern becomes equal to that of a behavior symbol sequence pattern used as training data of the abnormal behavior prediction model, and embedding a word in a zero-padded behavior symbol sequence pattern and converting a word-embedded behavior symbol sequence pattern into an input data format of the abnormal behavior prediction model.

Detecting the presence or non-presence of the attack and the device may include acquiring a score from the abnormal behavior prediction model to which the behavior symbol sequence pattern is input, determining whether the score is equal to or greater than a predetermined threshold value, and when it is determined that the score is equal to or greater than the predetermined threshold value, detecting appearance of an attack and identifying at least one of an attacking device or an infected device, or a combination thereof based on the profiles.

In accordance with a further aspect, there is provided a model training method for attack detection based on measurement of networking behavior abnormalities in symbolic spaces, the model training method including creating profiles based on a transmission address of a flow received from a network, measuring a behavior abnormality of a device corresponding to the transmission address of the flow on the network, and mapping the measured behavior abnormality to behavior symbols in symbolic spaces, generating a behavior symbol sequence pattern, in which the behavior symbols are sequentially connected, for each profile, generating a training dataset in which the behavior symbol sequence pattern for each profile is labeled with a normal state or an abnormal state, and training an abnormal behavior prediction model with the training dataset.

Training the abnormal behavior prediction model may include preprocessing the behavior symbol sequence pattern as input data of the abnormal behavior prediction model, and preprocessing may include converting the behavior symbol sequence pattern into a number list, padding the converted behavior symbol sequence pattern with zero such that a length of the converted behavior symbol sequence pattern becomes equal to that of a maximum behavior symbol sequence pattern, and embedding a word in a zero-padded behavior symbol sequence pattern and converting a word-embedded behavior symbol sequence pattern into an input data format of the abnormal behavior prediction model.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram illustrating an example in which networking behavior, expressed when a medical device is normal, is visualized;

FIG. 2 is a diagram illustrating an example in which networking behavior, expressed by a medical device is infected with ransomware or malware, is visualized;

FIG. 8 is a diagram illustrating an example of a behavior-period symbol mapping table according to an embodiment;

DESCRIPTION OF THE PREFERRED EMBODIMENTS

Figure 3:
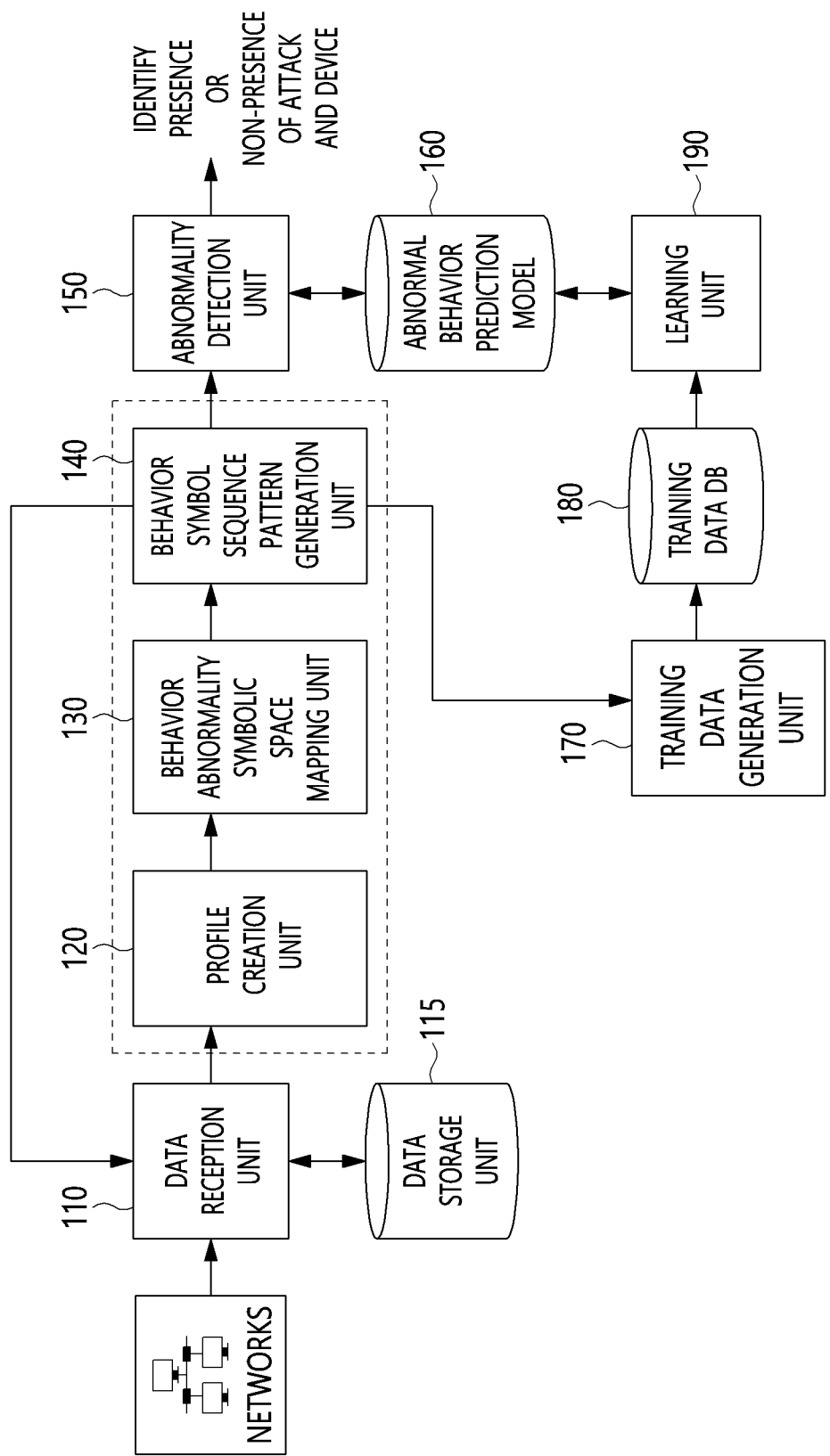
FIG. 3 is a schematic block configuration diagram of an attack detection apparatus based on measurement of networking behavior abnormalities in symbolic spaces according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an attack detection apparatus and method based on measurement of networking behavior abnormalities in symbolic spaces according to embodiments will be described in detail with reference to FIGS. 1 to 14.

The following embodiments propose a scheme for quantitatively measuring and patterning abnormal behavior of a medical device (IoMT device) at a network level depending on ransomware attacks, and quantitatively measuring abnormal behavior characteristics expressed due to ransomware attacks so as to detect and identify an infected device, and a scheme for patterning the measured abnormal behavior characteristics into a low-dimensional symbol sequence or a fingerprint and detecting and identifying a device expressing attacking behavior.

As a technical scheme to be applied to a network stage, a signature-based scheme and a behavior-based detection scheme have been taken into consideration.

Of the schemes, the signature-based scheme uses a known detection rule, thus effectively detecting known ransomware. However, in an actual environment in which even Wannacry has about 400 variants and tens of thousands of new ransomware have appeared within a year, such a signature-based scheme is very vulnerable to variants or unknown attacks, and signature evasion/avoidance attacks, and thus research into a networking behavior-based detection scheme has recently been actively conducted.

FIG. 1 is a diagram illustrating an example in which networking behavior, expressed when a medical device is normal, is visualized, and FIG. 2 is a diagram illustrating an example in which networking behavior, expressed by a medical device is infected with ransomware or malware, is visualized.

That is, FIG. 1 is a diagram illustrating an example of the case where networking behavior is clean (normal), and FIG. 2 is a diagram illustrating an example of the case where networking behavior is abnormal. That is, it can be seen that forms, in which networking behavior expressed depending on the operations of a normal device and a device including ransomware or malware is visualized, are different from each other.

Therefore, a core technology issue in the behavior-based detection scheme at a network level is a method for measuring abnormal behavior characteristics expressed on the network depending on the ransomware attacks and a method for patterning abnormal behavior characteristics in a low-dimensional form, detecting the appearance of attacks and identifying the corresponding device.

Accordingly, an embodiment proposes a scheme for setting indicators for measuring abnormal behavior characteristics to periodicity, familiarity, and attack entropy, and measuring networking behavior abnormalities from traffic data transmitted/received over the network while each medical device is operating.

Further, an embodiment proposes a scheme for symbolizing the measured three types of behavior abnormality values by 3D behavior symbols in symbolic spaces, for detecting a ransomware attack symptom based on a machine-learned model that is trained by using a behavior sequence, in which behavior symbols in successively occurring time-series traffic flows are combined with each other, as a behavior pattern, and for identifying a device showing the attack symptom.

Figures 4, 5, 6:
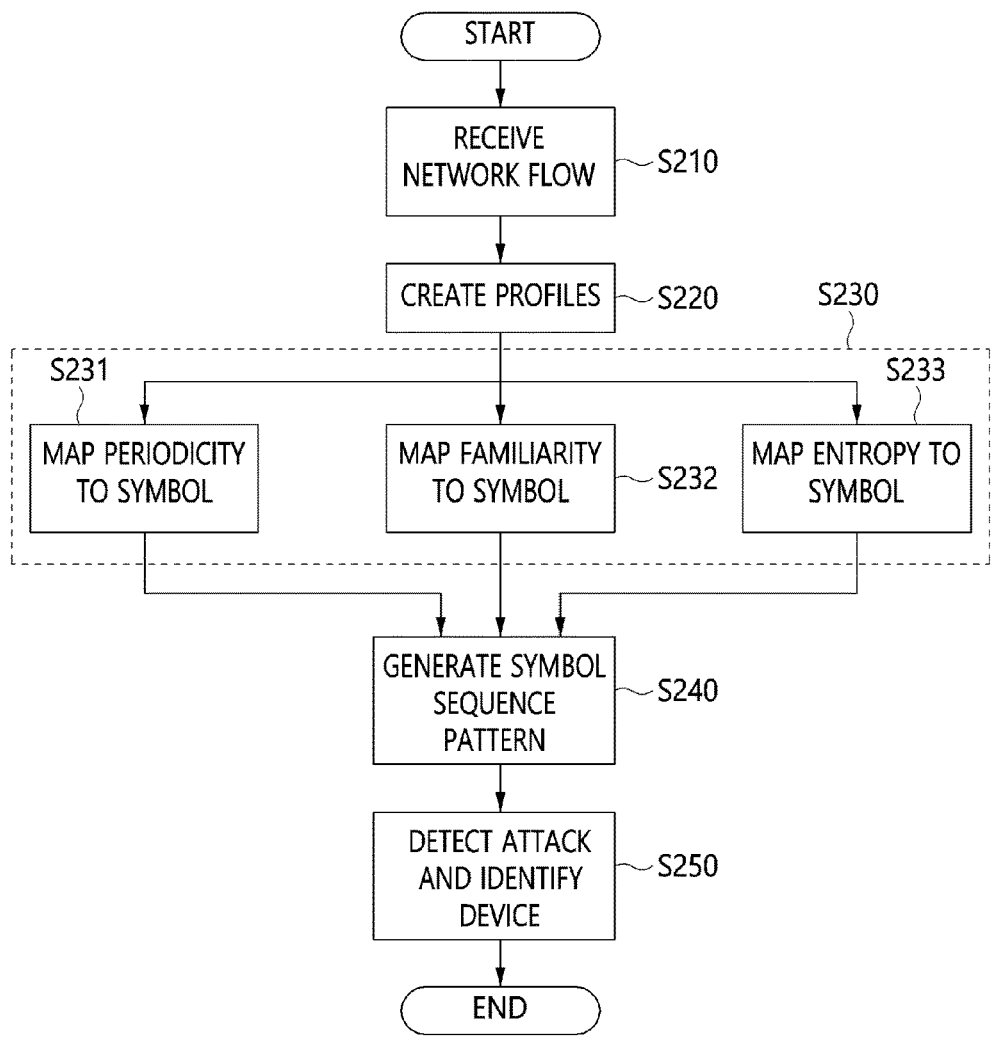
FIG. 4 is a diagram illustrating the structure of behavior symbol sequence pattern data according to an embodiment.
FIG. 5 is a diagram illustrating the structure of behavior symbol sequence pattern learning data according to an embodiment.
FIG. 6 is a flowchart illustrating an attack detection method based on measurement of networking behavior abnormalities in symbolic spaces according to an embodiment.

FIG. 3 is a schematic block configuration diagram of an attack detection apparatus based on measurement of networking behavior abnormalities in symbolic spaces according to an embodiment, FIG. 4 is a diagram illustrating the structure of behavior symbol sequence pattern data according to an embodiment, and FIG. 5 is a diagram illustrating the structure of behavior symbol sequence pattern learning data according to an embodiment.

Referring to FIG. 3, the attack detection apparatus 100 based on measurement of networking behavior abnormalities in symbolic spaces (hereinafter referred to as 'apparatus 100') may include a data reception unit 110, a profile creation unit 120, a behavior abnormality symbolic space mapping unit 130, a behavior symbol sequence pattern generation unit 140, and an abnormality detection unit 150. In addition, the apparatus 100 may further include a data storage unit 115, an abnormal behavior prediction model 160, a training data generation unit 170, a training data database (DB) 180, and a learning unit 190.

The data reception unit 110 receives a network flow NetFlow at a network level, and stores the network flow in the data storage unit 115.

Here, the network flow NetFlow may be time-series data collected from network sensors, such as a switch or an Audit Record Generation and Utilization System (Argus). Also, single-flow data a_Flow may be composed of <flowtime, Duration, Protocol, srcAddr, srcPort, dstAddr, dstPort, TotBytes, Label>, etc.

The profile creation unit 120 creates profiles based on the transmission address (source address) of the flow received from the network. That is, pieces of flow data for respective device services may be generated and managed for respective profiles.

Such profiles may enable traffic randomly received from the network switch to be reclassified and managed with respect to transmitting devices (transmitters or sources), and may then be used to measure a networking behavior abnormality with respect to a specific device and to facilitate the analysis of a behavior sequence pattern and management of learning data.

Further, each of the profiles may include a profile identifier (ID) and flow information.

Here, the profile ID may be composed of <srcAddr, timewindow_id, Protocol, dstAddr, dstPort>. For example, the profile ID may be "10.30.213.79_timewindow0: 10.30.213.255:netbios-dgm:udp". Furthermore, the flow information may include received data configuration items of the single flow a_Flow.

The behavior abnormality symbolic space mapping unit 130 measures the behavior abnormality of a device corresponding to the transmission address (source address) of the flow on the network, and maps the measured behavior abnormality to a behavior symbol in a symbolic space.

In accordance with an embodiment, the symbolic space may include 66 symbols as behavior symbols. That is, with respect to each single flow, the behavior of a transmitter (i.e., source address: srcAddr) may be quantitatively measured, and a measurement value may be mapped to one of the 66 symbols included in symbolic spaces.

In this case, an indicator for measuring the behavior abnormality of the transmitter may include at least one of behavior periodicity, behavior familiarity, or behavior entropy or a combination thereof. Therefore, the behavior abnormality symbolic space mapping unit 130 may map each of the behavior periodicity, the behavior familiarity, and the behavior entropy to a behavior symbol in the corresponding symbolic space.

Here, behavior periodicity refers to an indicator for measuring periodic characteristics of behavior in the corresponding flow from the standpoint of change in communication size (Totbytes size), change in time (duration or inter-flow arrival time), and occurrence frequency. For example, a flow, having "10.30.213.79_timewindow0:10.30.213.255: netbios-dgm:udp" as the profile ID, means that networking behavior is conducted from a device having a source address of '10.30.213.79' to a device having a destination address of '10.30.213.255' at time 'timewindow0' based on a 'udp' service protocol using the port 'netbios-dgm'.

Further, behavior familiarity refers to an indicator for measuring the degree to which a behavior-relational operation (dstPort, protocol) between a transmitting device (srcAddr) and a receiving device (dstAddr) networking with the transmitting device is familiar to that of a previous communication pattern. Therefore, it can be seen that, as familiarity is higher, a previously learned behavior-relationship is repeated, whereas as familiarity is lower, a new attempt is made. For example, when a device infected with ransomware attempts to access a C&C server located on a new external network, familiarity may be measured to be low. In addition, when an attacker attempts to scan a new target (dstAddr), this scanning may also be recognized as new behavior, and thus familiarity may be measured to be low.

Furthermore, behavior entropy is an indicator for measuring scanning attacker behavior in which the transmitting device (srcAddr) searches for a target so as to spread ransomware or the like. In this case, the behavior entropy is measured from the standpoint of port scanning entropy and target scanning entropy. Here, it may be determined that, when entropy is higher, there is a strong possibility that the behavior is a scanning attack, whereas when entropy is lower, the behavior is normal.

Detailed description of the process in which the behavior abnormality symbolic space mapping unit 130 maps each of the behavior periodicity, the behavior familiarity, and the behavior entropy to a behavior symbol in a symbolic space will be made later with reference to FIGS. 7 to 11.

The behavior symbol sequence pattern generation unit 140 generates a behavior symbol sequence pattern, in which behavior symbols are sequentially connected, for each profile.

Referring to FIG. 4, the behavior symbol sequence pattern data may include a profile ID and a 3D symbolic behavior sequence.

In this case, the behavior symbol sequence pattern generation unit 140 generates a 3D behavior symbol by combining a behavior periodicity symbol, a behavior familiarity symbol, and a behavior entropy symbol with each other.

In this case, the 3D behavior symbol may be generated for each individual flow. For example, when n flows are present in the profile of the transmitter (srcAddr), n 3D behavior symbols may be generated depending on the order of flows that are sequentially transmitted.

Thereafter, the behavior symbol sequence pattern generation unit 140 may add the generated 3D behavior symbols to the behavior symbol sequence of the corresponding profile. That is, a behavior symbol sequence list may be extended in such a way as to add the corresponding 3D behavior symbol to the end of the behavior symbol sequence list of the profile corresponding to the single flow a_Flow. When only a single flow is received, only one 3D behavior symbol is included in the behavior symbol sequence. However, as a new behavior symbol is added whenever a new flow is subsequently received, the length of the sequence may be increased.

Here, the abnormality detection unit 150 may detect, using the abnormal behavior prediction model 160, whether an attack, such as ransomware, appears depending on whether the behavior symbol sequence pattern generated from the network flow received in real time is normal or abnormal. Furthermore, when it is determined that the behavior symbol is abnormal, the abnormality detection unit 150 identifies an infected device or an attacking device based on the profile mapped to the behavior symbol sequence pattern.

Description of the detailed operation of the abnormality detection unit 150 will be made later with reference to FIG. 12.

Meanwhile, the abnormal behavior prediction model 160 may be a model that is pre-trained based on a training dataset, in which the behavior symbol sequence pattern for each profile is labeled with one of a normal state and an abnormal state.

Here, the training dataset may be generated by allowing the training data generation unit 170 to label the behavior symbol sequence pattern output from the behavior symbol sequence pattern generation unit 140 with normality or abnormality.

That is, referring to FIG. 5, the behavior symbol sequence pattern data included in the training dataset may include a profile ID, a 3D symbolic behavior sequence, and a label. That is, the label may be added to the behavior symbol sequence pattern illustrated in FIG. 4, and thus resulting data may be generated as the training data.

Then, the learning unit 190 may train the abnormal behavior prediction model 160 in advance with the training dataset stored in the training data DB 180. Detailed description of the learning unit 190 will be made later with reference to FIG. 13.

FIG. 6 is a flowchart for explaining an attack detection method based on measurement of networking behavior abnormalities in symbolic spaces according to an embodiment.

Referring to FIG. 6, the attack detection method based on measurement of networking behavior abnormalities in symbolic spaces according to the embodiment may include steps S210 and S220 of creating profiles based on the transmission (source) address of a flow received from a network, step S230 of measuring behavior abnormality of a device corresponding to the transmission address of the flow on the network and mapping the measured behavior abnormality to behavior symbols in symbolic spaces, step S240 of generating a behavior symbol sequence pattern, in which behavior symbols are sequentially connected, for each profile, and step S250 (see FIG. 12) of detecting presence or non-presence of an attack and a device associated with the attack based on the output of an abnormal behavior prediction model which receives the behavior symbol sequence pattern as input.

Here, step S230 of mapping the measured behavior abnormality to the behavior symbols according to an embodiment may include step S231 (see FIGS. 7 to 9) of measuring behavior periodicity from a network flow and mapping the behavior periodicity to a symbol, step S232 (see FIG. 10) of measuring behavior familiarity and mapping the behavior familiarity to a symbol, and step S233 (see FIG. 11) of measuring behavior entropy and mapping the behavior entropy to a symbol.

Here, at step S240 of generating the behavior symbol sequence pattern, a behavior periodicity symbol, a behavior familiarity symbol, and a behavior entropy symbol may be sequentially combined with each other to generate a 3D behavior symbol. Here, the behavior periodicity symbol may be composed of two characters, the behavior familiarity symbol may be composed of one character, and the behavior entropy symbol may be composed of two characters, and thus the 3D behavior symbol may be composed of five characters.

Figure 7:
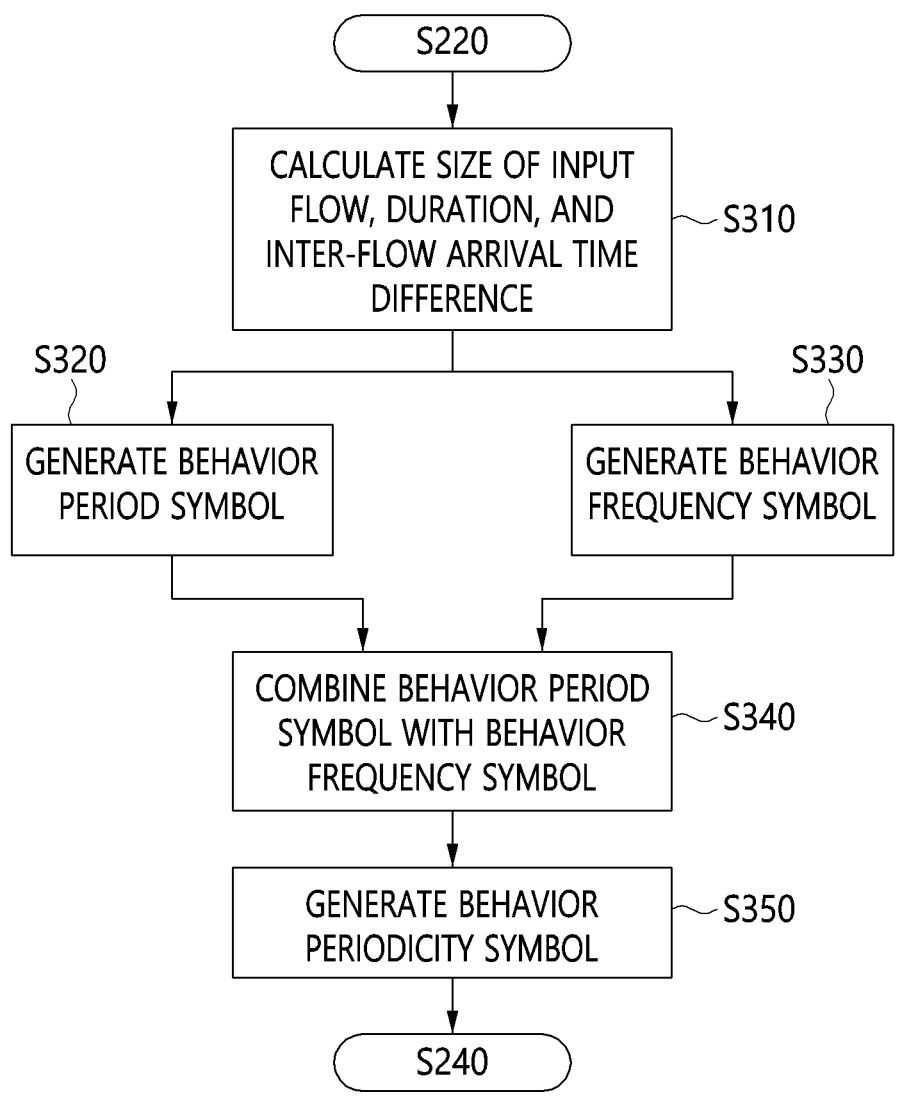
FIG. 7 is a flowchart for explaining the step of measuring behavior periodicity and mapping behavior periodicity to a symbol according to an embodiment.
Figure 9:
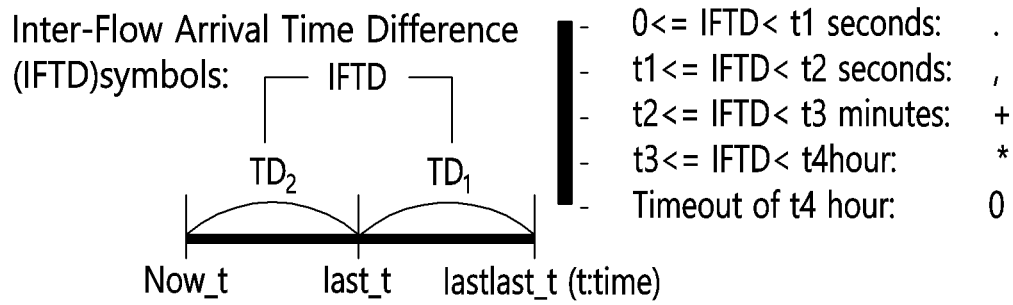
FIG. 9 is a diagram illustrating behavior frequency symbol mapping according to an embodiment.

FIG. 7 is a flowchart for explaining step S231 (see FIGS. 7 to 9) of measuring behavior periodicity from the network flow and mapping the behavior periodicity to a symbol, FIG. 8 is a diagram illustrating an example of a behavior period symbol mapping table according to an embodiment, and FIG. 9 is a diagram illustrating behavior frequency symbol mapping according to an embodiment.

Referring to FIG. 7, step S231 of measuring behavior periodicity from the network flow and mapping the behavior periodicity to a symbol according to the embodiment may include steps S310 to S330 of generating a behavior period symbol and a behavior frequency symbol based on a flow size (Totbytes), a flow duration, and the difference between arrival times of flows (i.e., inter-flow arrival time difference: IFTD), and steps S340 and S350 of generating a behavior periodicity symbol by combining the behavior period symbol with the behavior frequency symbol.

At step S231 of measuring behavior periodicity from the network flow and mapping the behavior periodicity to a symbol according to the embodiment, flow data a_Flow may be received, and then a behavior periodicity symbol may be output.

At step S310, the flow size (Totbytes) and the flow duration may be acquired from the single flow data a_Flow.

Further, at step S310, the inter-flow arrival time difference (IFTD) may be calculated as '−1', which is a default value, at an initial stage in which a single flow is received, and after reception of two or more flows, the IFTD may be calculated using the following Equation (1):

$$\text{IFTD}=(\text{now}\_t-\text{last}\_t)-(\text{last}\_t-\text{lastlast}\_t) \tag{1}$$

In Equation (1), now_t denotes the current flow time, last_t denotes a just previous flow time, and lastlast_t denotes the time previous to the previous flow time.

At step S320, a behavior period symbol may be generated based on the flow size (Totbytes), the flow duration, and the IFTD.

That is, referring to FIG. 8, flows may be classified into states {{Small, Medium, Large}, {Short, Medium, Long}, {strong_periodicity, weak_periodicity, weak_non_periodicity, strong_non_periodicity}} using the measured flow size (Totbytes), flow duration, and IFTD values, and then the behavior period symbol may be assigned thereto.

Here, reference values [sst, mst, st, mt, spt, wpt, wnt, snt] required for state classification may be set through experimental analysis.

Meanwhile, at step S320, the behavior frequency symbol may be generated based on the inter-flow arrival time difference (IFTD) measurement value. Here, as the behavior frequency symbol, a symbol corresponding to the condition illustrated in FIG. 9 may be allocated.

Here, reference values [t1, t2, t3, t4] required for condition classification may be experimentally determined.

Thereafter, at step S340, the behavior period symbol and the behavior frequency symbol is combined with each other, and the behavior periodicity symbol of the corresponding flow is finally generated at step S350. For example, the behavior periodicity symbol may be '-|-=-=-==|=|=|=|=|=='.

Figure 10:
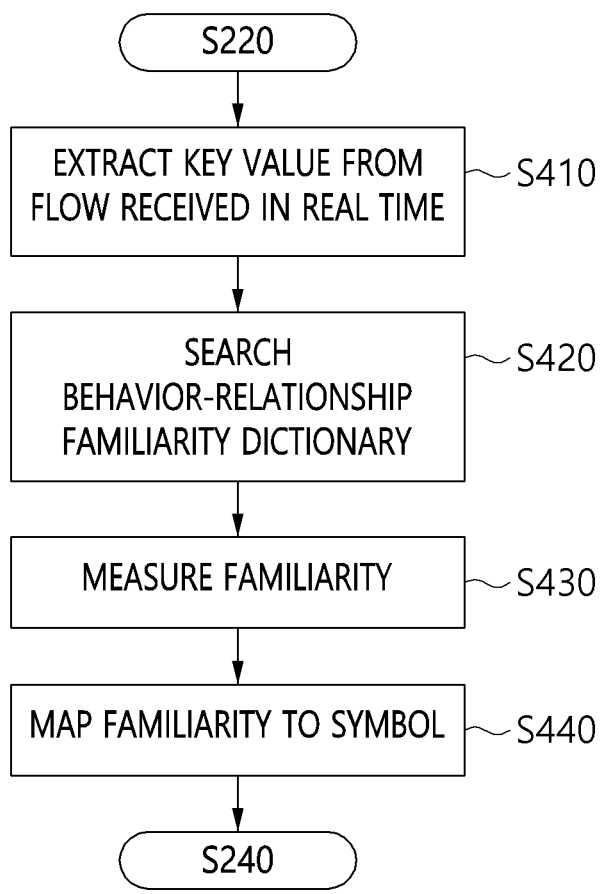
FIG. 10 is a flowchart for explaining the step of measuring behavior familiarity and mapping behavior familiarity to a symbol according to an embodiment.

FIG. 10 is a flowchart illustrating step S232 of measuring behavior familiarity and mapping the behavior familiarity to a symbol according to an embodiment.

Referring to FIG. 10, step S232 of measuring behavior familiarity and mapping the behavior familiarity to a symbol according to the embodiment may include steps S410 to S430 of measuring behavior familiarity depending on whether at least one key value extracted from the flow is present in a network familiarity model dictionary, and step S440 of mapping the measured behavior familiarity to a symbol.

At step S232 of measuring behavior familiarity and mapping the behavior familiarity to a symbol according to the embodiment, flow data a_Flow is received, and then a behavior familiarity symbol is output.

At step S410, as the flow data a_Flow is input, a transmitter (srcAddr), a receiver (dstAddr), and a service protocol may be extracted as key values.

Here, a network familiarity model found at step S420 may be created in advance based on a network flow dataset in a normal state. That is, the network familiarity model may be created by learning context for a behavioral relationship between all flows <SrcAddr, dstAddr, dstPort, srcAddr_dstAddr_Protocol> using a word-to-vector (Skip-gram) scheme based on the network flow dataset in a normal state in which no attack is present. The behavior familiarity model created in this way may be utilized as a behavior-relationship familiarity dictionary for the entire network.

At step S430, one of values included in the range of {0, 1, 2, 3, and 4} may be allocated as the familiarity of the corresponding profile flow based on the result of searching for the network familiarity model.

Here, when a session of service is represented by "Service=srcAddr_dstAddr_dstPort_Protocol", a familiarity value may be allocated based on the following rules.

First, when 'Service' is present in the familiarity dictionary, '0' may be allocated to the familiarity. For example, this means that the transmitting device has a relationship of exchanging service with the corresponding receiving device (receiver or destination), and familiarity to the corresponding receiving device is the highest level.

Next, when 'Service' is not present in the familiarity dictionary, but 'srcAddr, dstAddr' is present, '1' may be allocated to the familiarity. For example, this means the state in which the transmitting device has a relationship of communicating with the corresponding receiving device, but a received protocol service (e.g., rtcp) is initially requested.

Further, when 'srcAddr' is present in the familiarity dictionary, but 'dstAddr' is not present therein, '2' may be allocated to the familiarity. For example, this means the state in which a transmitting device in an internal network attempts to access a strange receiving device (e.g., C&C server) in an external network.

Furthermore, when 'srcAddr' is not present in the familiarity dictionary, but 'dstAddr' is present, '3' may be allocated to the familiarity. For example, a strange transmitting device (e.g., an attacker) in an external network attempts to access a device in the internal network so as to acquire the authority thereto.

Furthermore, when neither 'srcAddr' nor 'dstAddr' is present in the familiarity dictionary, '4' may be allocated to the familiarity. For example, this means the lowest familiarity level at which a strange transmitter and a strange receiver use the relevant internal network without permission.

Thereafter, at step S440, the familiarity symbols may be mapped based on the following Table 1.

TABLE 1

| Familiarity | Symbol | Meaning (familiarity level) |
|---|---|---|
| 0 | ) | (familiar) service-level |
| 1 | ! | (unfamiliar to service) not service, but dstAddr-level |
| 2 | @ | (unfamiliar to receiver) not dstip, but srcip-level |
| 3 | # | (unfamiliar to transmitter) Not srcip, but dstip-level |
| 4 | $ | (unfamiliar to transmitter and receiver) Not srcip, but dstip level |

Referring to Table 1, when familiarity is '0', a familiarity symbol of ')' may be mapped thereto, when familiarity is '1', a familiarity symbol of '!' may be mapped thereto, when familiarity is '2', a familiarity symbol of '@' may be mapped thereto, when familiarity is '3', a familiarity symbol of '#' may be mapped thereto, and when familiarity is '4', a familiarity symbol of '$' may be mapped thereto.

Figure 11:
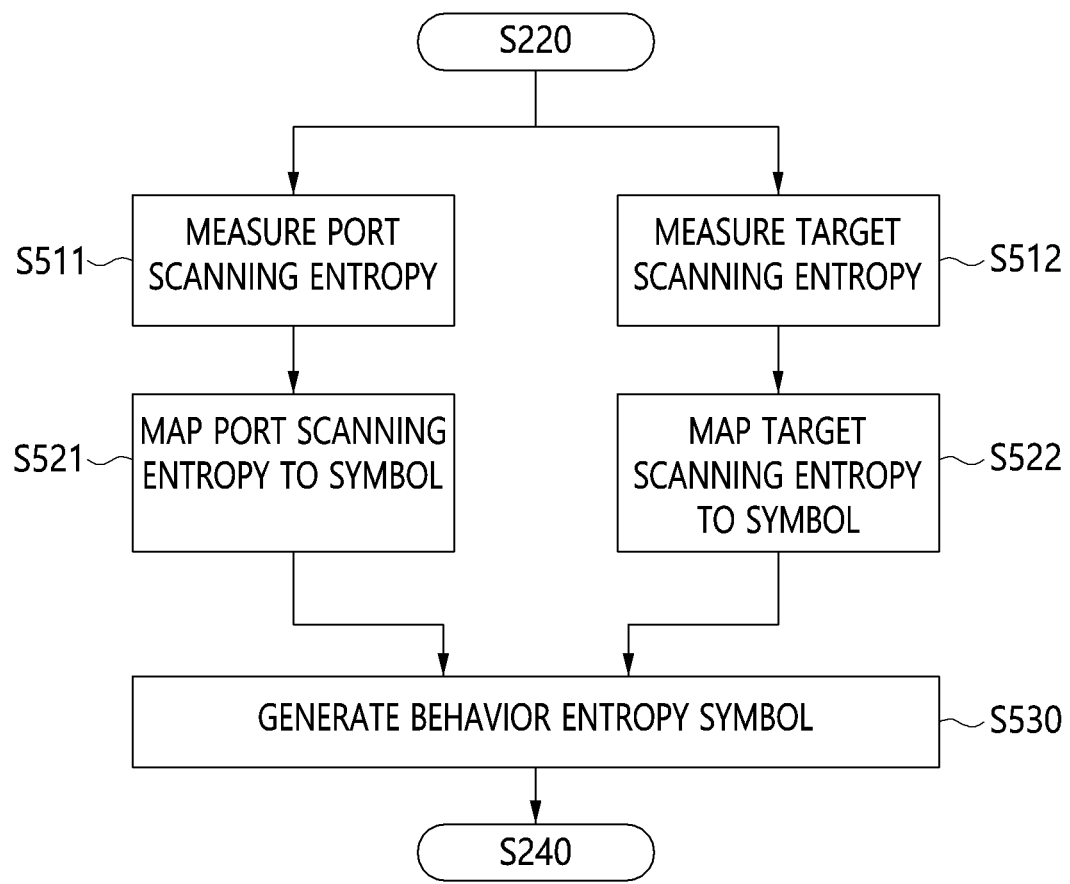
FIG. 11 is a flowchart for explaining the step of measuring behavior entropy and mapping the behavior entropy to a symbol according to an embodiment.

FIG. 11 is a flowchart for explaining step S233 of measuring behavior entropy and mapping the behavior entropy to a symbol according to an embodiment.

Referring to FIG. 11, step S233 of measuring behavior entropy and mapping the behavior entropy to a symbol according to an embodiment may include steps S511 and S512 of measuring port scanning entropy and target scanning entropy, steps S521 and S522 of mapping the measured port scanning entropy and target scanning entropy to respective symbols, and step S530 of generating an entropy symbol having a size of two characters by combining the mapped two symbols with each other.

At step S233 of measuring behavior entropy and mapping the behavior entropy to a symbol according to an embodiment, profile data corresponding to flow data a_Flow is received, and then a behavior entropy symbol is output.

Here, because the profile data is time-series data, it may be configured in the form of a hash table having <transmitting device (srcAddr), timewindow_id (e.g., timewindow=1 hour), protocol> as a key.

Assuming that X is srcAddr of a flow, dP is dstPort, Y is dstAddr, and P(x) is a probability distribution of x, the entropy of the probability variable X may be $H(X) = -\Sigma_x P(x) \log P(x)$, and the combination entropy of the probability variables X and Y may be $H(X,Y) = E_{x,y} P(x,y) \log_2(1/P(x,y))$.

Here, at step S511, the port scanning entropy may be calculated using the following Equation (2). Port scanning may correspond to the problem of searching for the number of ports dP attempting to make access under the condition in which transmitter X communicates with receiver Y. As the number of dP attempting to make access is larger, the entropy value may become larger.

$$H(dP|(Y|X)) = H(dP,(Y|X)) - H(Y|X))$$

$$H(Y|X) = H(X,Y) - H(X) \quad (2)$$

Further, at step S512, the target scanning entropy may be calculated using the following Equation (3). Here, target scanning may correspond to the problem of finding the number of target receivers Y to which transmitter X attempts to make access using a service port dP. That is, assuming that the number of Ys increases and an entropy value becomes larger whenever measurement is performed, it may be inferred that a scanning attack of searching for target devices which use the same port is currently being made.

$$H(Y|(dP|X))=H(Y,(dP|X))-H(dP|X))-H(dP|X)),H(dP|X)=H(dP,X)-H(X) \quad (3)$$

At steps S521 and S522, respective entropy measurement values may be mapped to symbolic spaces corresponding to 10 intervals, such as those shown in Table 2, depending on the magnitudes thereof, and thus two behavior entropy symbols may be generated.

TABLE 2

| H0 < 1 | 1 <= H0 < 2 | 2 <= H0 < 3 | 3 <= H0 < 4 | 4 <= H0 < 5 | 5 <= H0 < 6 | 6 <= H0 < 7 | 7 <= H0 < 8 | 8 <= H0 < 9 | 9 <= H0 < 10 | H0 > 10 |
|---|---|---|---|---|---|---|---|---|---|---|
| - | \| | = | ~ | / | & | ; | < | ^ | > | ? |

At step S530, the generated two symbols may be combined with each other, and thus an entropy symbol having a size of two characters may be generated.

Figure 12:
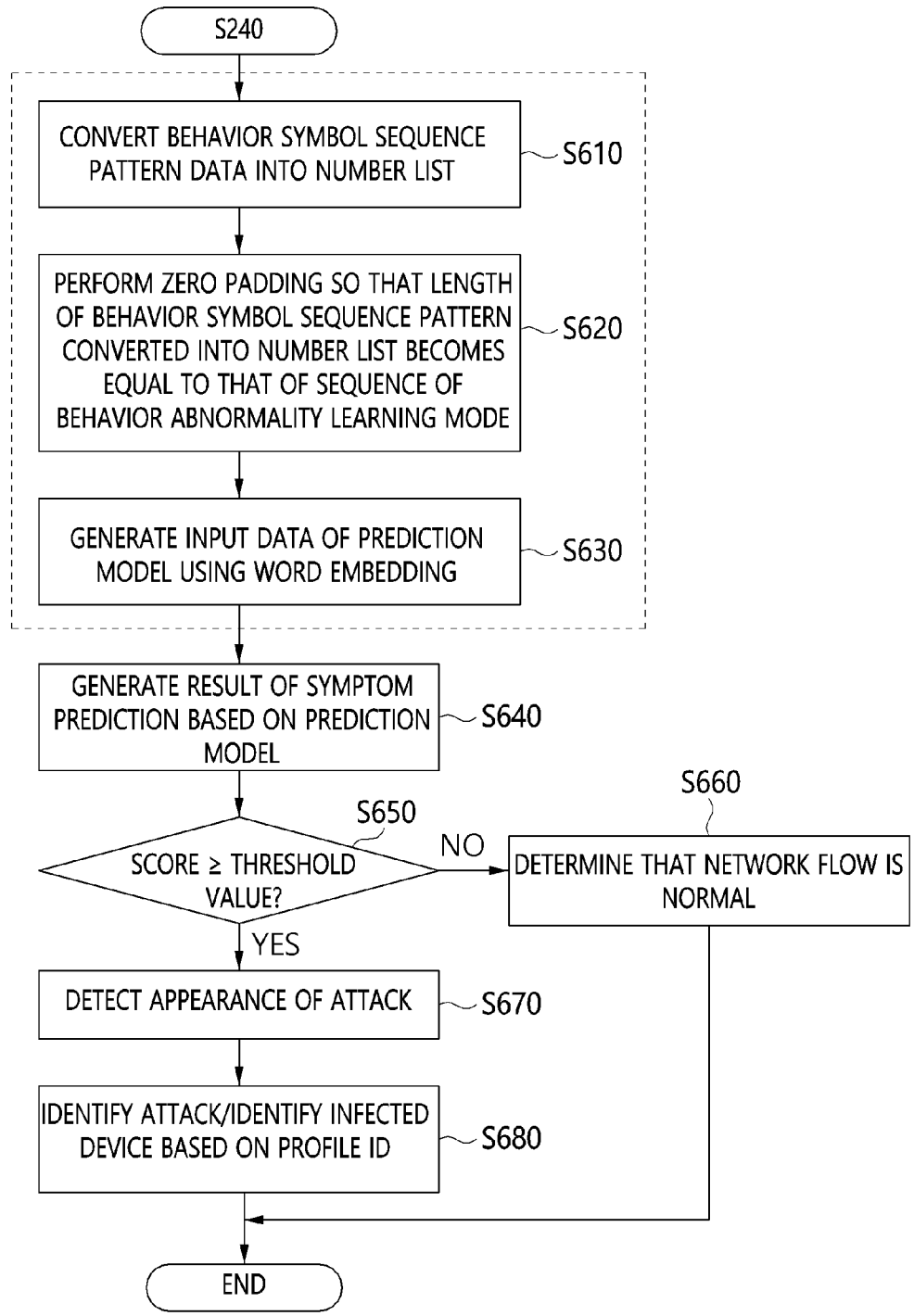
FIG. 12 is a flowchart for explaining the step of detecting an attack and identifying a device according to an embodiment.

FIG. 12 is a flowchart for explaining the step of detecting presence or non-presence of an attack and a device associated with the attack.

Referring to FIG. 12, step S250 of detecting presence or non-presence of an attack and a device associated with the attack according to an embodiment may include step S640 of acquiring a score from an abnormal behavior prediction model to which the behavior symbol sequence pattern is input, step S650 of determining whether the score is equal to or greater than a predetermined threshold value, and steps S670 and S680 of, when it is determined that the score is equal to or greater than the predetermined threshold value, detecting appearance of an attack and identifying at least one of an attacking device or an infected device or a combination thereof based on profiles.

However, step S250 of detecting the presence or non-presence of an attack and the device associated with the attack according to an embodiment may further include steps S610 to S630 of preprocessing the behavior symbol sequence pattern as input data of the abnormal behavior prediction model.

That is, the preprocessing step may include step S610 of converting data of the behavior symbol sequence pattern into a number list, step S620 of padding the converted behavior symbol sequence pattern with 'zero' so that the length of the behavior symbol sequence pattern becomes equal to that of the input sequence of a behavior abnormality learning model (i.e., abnormal behavior prediction model), and step S630 of converting the zero-padded behavior symbol sequence pattern into the input data format of the abnormal behavior prediction model by embedding a word in the zero-padded behavior symbol sequence pattern.

At step S610, symbols in the behavior symbol sequence pattern composed of 66 symbolic spaces are converted into a number list. For example, sequence pattern '9)--9,' may be converted into [[44.0], [50.0], [55.0], [55.0], [44.0], [46.0]].

Also, the behavior symbol sequence pattern not only has different lengths for respective profiles, but also has a length different from the input sequence of the abnormal behavior prediction model, and thus the behavior symbol sequence pattern, which is an inference target at step S620, may be post-padded with zero.

At step S640, the preprocessed data may be input to the abnormal behavior prediction model, and thus a score indicating the result of prediction of a symptom may be calculated.

At step S680, an attacker (10.30.213.79) and a victim (10.30.213.255) may be identified based on the profile ID, for example, "10.30.213.79_timewindow0:10.30.213.255: netbios-dgm:u" included in the input data of the abnormal behavior prediction model.

Figure 13:
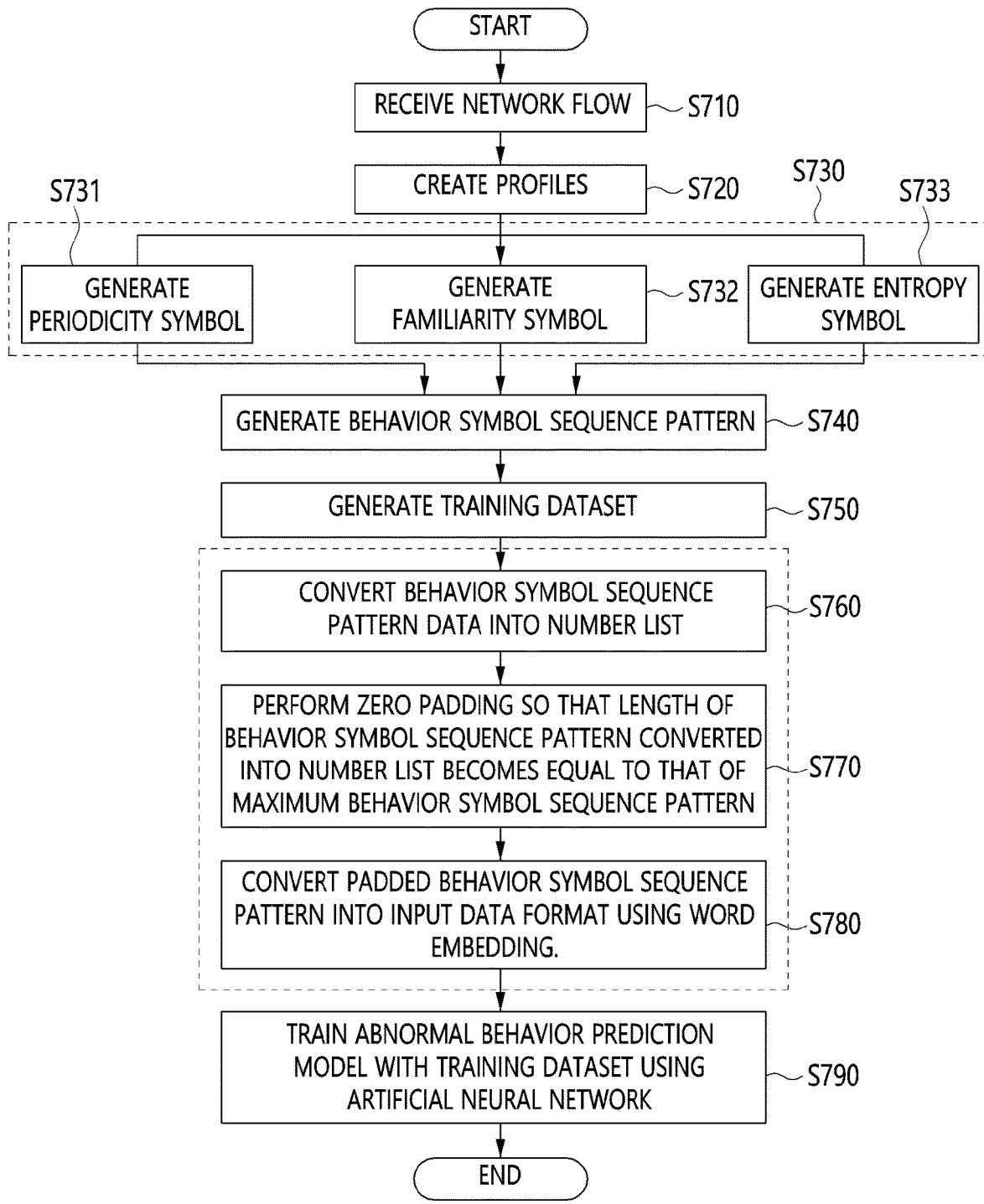
FIG. 13 is a flowchart illustrating a method for training an abnormal behavior prediction model for attack detection based on measurement of networking behavior abnormalities in symbolic spaces according to an embodiment.

FIG. 13 is a flowchart for explaining a method for training an abnormal behavior prediction model for attack detection based on measurement of networking behavior abnormalities in symbolic spaces according to an embodiment.

Referring to FIG. 13, the method for training an abnormal behavior prediction model for attack detection based on measurement of networking behavior abnormalities in symbolic spaces according to the embodiment may include steps S710 and S720 of creating profiles based on the transmission (source) address of a flow received from a network, step S730 (S731, S732) of measuring behavior abnormality of a device corresponding to the transmission address of the flow on the network and mapping the measured behavior abnormality to behavior symbols in symbolic spaces, step S740 of generating a behavior symbol sequence pattern, in which behavior symbols are sequentially connected, for each profile, step S750 of generating a training dataset in which the behavior symbol sequence pattern for each profile is labeled with a normal state or an abnormal state, and step S790 of training the abnormal behavior prediction model with the training dataset.

Steps S710 to S740 are identical to steps S210 to S240 illustrated in FIG. 6, and thus detailed descriptions thereof will be omitted.

Here, before step S790 of training the abnormal behavior prediction model with the training dataset is performed, the method may further include steps S760 to S780 of preprocessing the behavior symbol sequence pattern included in the training dataset as input data of the abnormal behavior prediction model.

Here, the preprocessing step may include step S760 of converting data of the behavior symbol sequence pattern into a number list, step S770 of padding the behavior symbol sequence pattern with 'zero' so that the length of the behavior symbol sequence pattern becomes equal to that of a maximum behavior symbol sequence pattern, and step S780 of converting the zero-padded behavior symbol sequence into the input data format of the abnormal behavior prediction model by embedding a word in the zero-padded behavior symbol sequence pattern.

Steps S760 to S780 are identical to steps S610 to S630 of FIG. 12, and thus detailed descriptions thereof will be omitted.

At step S750, the behavior symbol sequence pattern acquired at steps S710 to S740 may be labeled, and thus the training dataset such as that shown in Table 3 may be generated.

TABLE 3

| profile ID(srcAddr_timewindow_tuple) | STATE(3D behavior symbol sequence pattern) | LABEL |
|---|---|---|
| 10.30.213.45_timewindow0:224.0.0.252:hostmon:udp | 1)--1.)--a.)--a.)--a.)--a.)--a.)--a.)--a.)--a.)--a.)--a.)--a.)--a.)--a.)--a.)--a.)--a*)--a.)--a.) - | "normal" |
| 10.30.213.26_timewindow1:239.252.255.250:ssdp:udp | 4)--4.)--d.)--d.)--h.)--d.)--d.)--d.)--d.)--g.)--X*)--U.)--d.)--d.)--d.)--d.)--u.)--d.)--d.)--d.)--d.)--d.)--d.)--d.)--g+)--U.)--u.)--U+)--d.) - | "normal" |
| 10.30.213.79_timewindow1:10.30.213.255:netbios-dgm:udp | 9) \|-1,) \|-A+) \|-w,) \|-f,) \|-A,) \|-r+) \|-F,) \|-A,) \|-r,) \|-r+) \|-w,) \|-F,) \| -F,) \|-R*) \|-A*) \|-a*) \|-y+) \|-r,) \|-r+) \|-w,) \|-Y*) \|- | "anomalo" |

Referring to Table 3, the training dataset may be composed of <profile ID, StateList(3D behavior symbol sequence) and Label>.

Further, at step S790, the abnormal behavior prediction model may be composed of a recurrent neural network, that is, RNN, Long Short-Term Memory (LSTM), a Gated Recurrent Unit (GRU), etc. and then be trained.

Figure 14:
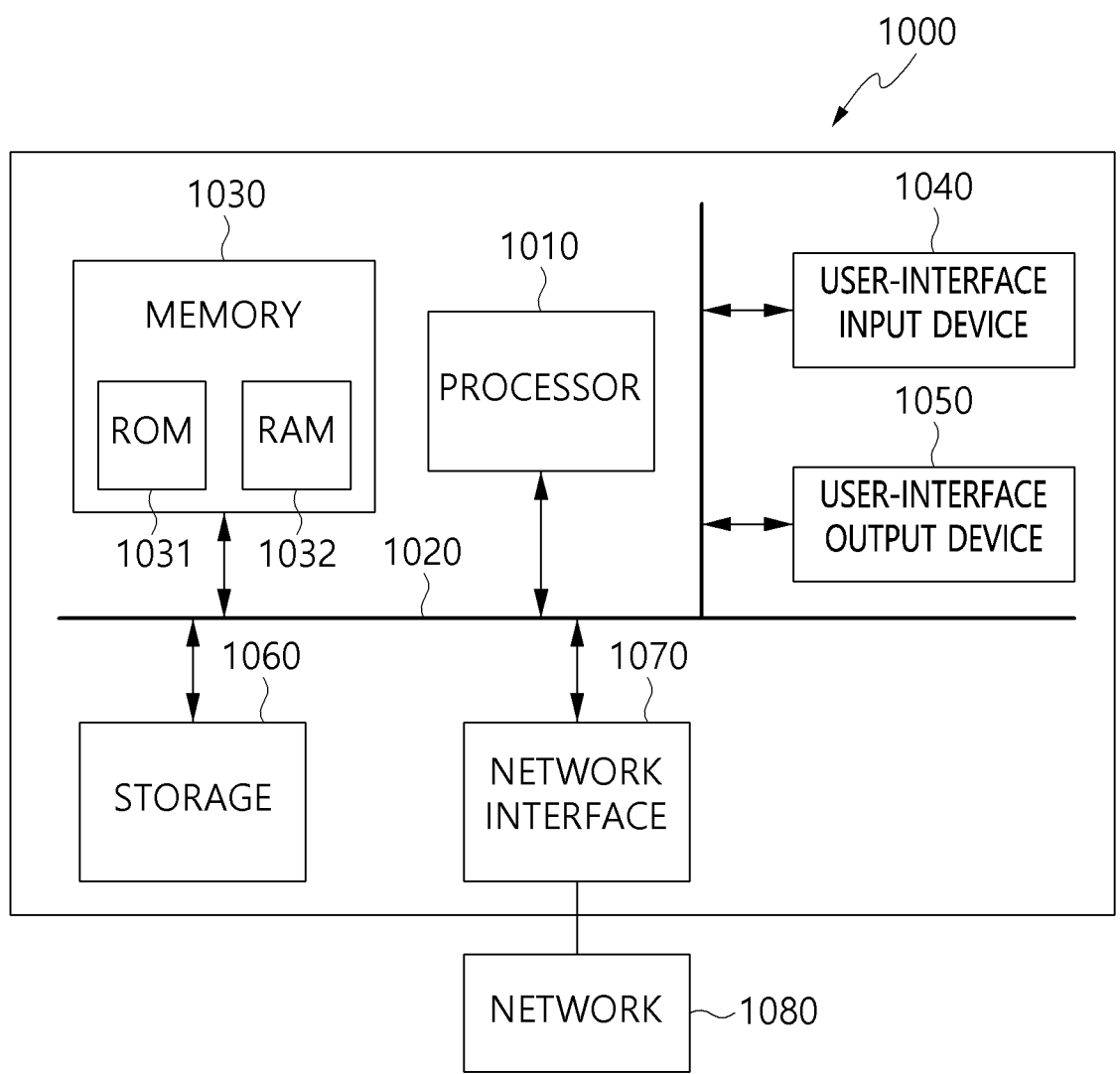
FIG. 14 is a diagram illustrating the configuration of a computer system according to an embodiment.

FIG. 14 is a diagram illustrating the configuration of a computer system according to an embodiment.

The attack detection apparatus based on measurement of networking behavior abnormalities in symbolic spaces according to an embodiment may be implemented in a computer system 1000, such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with the described embodiments, attempts to make ransomware attack on medical devices at a network level may be effectively detected, thus preventing the spread of ransomware attack attempts.

In accordance with the described embodiments, behavior abnormality indicators of a specific device are defined as periodicity, familiarity, and attack entropy and are measured at a network stage in which transmission traffic and reception traffic are transferred together, and thus the indicators are symbolized into five simple behavior symbols, with the result that the sequence pattern of networking behavior may be intuitively and visually easily detected.

In accordance with the described embodiments, an attack symptom may be detected using a low-dimension behavior symbol sequence as input, thus facilitating implementation of fast self-learning and detection while easily identifying an attacker and a victim.

Although the embodiments of the present invention have been disclosed with reference to the attached drawing, those skilled in the art will appreciate that the present invention can be implemented in other concrete forms, without changing the technical spirit or essential features of the invention.

Therefore, it should be understood that the foregoing embodiments are merely exemplary, rather than restrictive, in all aspects.

What is claimed is:

1. An attack detection apparatus based on measurement of networking behavior abnormalities in symbolic spaces, comprising:
   a memory configured to store at least one program and an abnormal behavior prediction model; and
   a processor configured to execute the program,
   wherein the program is configured to perform:
   creating profiles based on a transmission address of a flow received from a network,
   measuring a behavior abnormality of a device corresponding to the transmission address of the flow on the network, and mapping the measured behavior abnormality to behavior symbols in symbolic spaces,
   generating a behavior symbol sequence pattern, in which the behavior symbols are sequentially connected, for each profile, and
   detecting presence or non-presence of an attack and a device associated with the attack based on an output of the abnormal behavior prediction model that receives the behavior symbol sequence pattern as input,
   wherein the program is configured to perform, in mapping,
   generating a behavior period symbol and a behavior frequency symbol based on a flow size, a flow duration, and an inter-flow arrival time difference (IFTD), and
   generating a behavior periodicity symbol by combining the behavior period symbol with the behavior frequency symbol.

2. The attack detection apparatus of claim 1, wherein:
   the behavior abnormality includes, as a measurement indicator thereof, at least one of behavior periodicity, behavior familiarity, or behavior entropy or a combination thereof, and
   the program is configured to perform, in mapping,
   mapping each of the behavior periodicity, the behavior familiarity, and the behavior entropy to a behavior symbol in a symbolic space.

3. The attack detection apparatus of claim 2, wherein:
   the memory is configured to further store a network familiarity model created in advance based on a network flow dataset in a normal state, and
   the program is configured to perform, in mapping,
   measuring behavior familiarity depending on whether at least one key value extracted from the flow is present in a network familiarity model dictionary, and
   mapping the measured behavior familiarity to a symbol.

4. The attack detection apparatus of claim 2, wherein the program is configured to perform, in mapping,
   measuring a port scanning entropy and a target scanning entropy, mapping the port scanning entropy and the target scanning entropy to respective symbols, and generating an entropy symbol by combining the two mapped symbols with each other.

5. The attack detection apparatus of claim 2, wherein the program is configured to perform, in generating the behavior symbol sequence pattern, generating a three-dimensional (3D) behavior symbol by combining a behavior periodicity symbol, a behavior familiarity symbol, and a behavior entropy symbol with each other, and adding the generated 3D behavior symbol to a behavior symbol sequence pattern of the corresponding profile.

6. The attack detection apparatus of claim 1, wherein the abnormal behavior prediction model is pre-trained based on a training dataset in which the behavior symbol sequence pattern for each profile is labeled with a normal state or an abnormal state.

7. The attack detection apparatus of claim 1, wherein the program is configured to further perform, in detecting, preprocessing the behavior symbol sequence pattern as input data of the abnormal behavior prediction model, and wherein preprocessing comprises:

converting the behavior symbol sequence pattern into a number list;

padding the converted behavior symbol sequence pattern with zero such that a length of the converted behavior symbol sequence pattern becomes equal to that of a behavior symbol sequence pattern used as training data of the abnormal behavior prediction model; and embedding a word in a zero-padded behavior symbol sequence pattern and converting a word-embedded behavior symbol sequence pattern into an input data format of the abnormal behavior prediction model.

8. The attack detection apparatus of claim 1, wherein the program is configured to perform, in detecting, acquiring a score from the abnormal behavior prediction model to which the behavior symbol sequence pattern is input, determining whether the score is equal to or greater than a predetermined threshold value, and when it is determined that the score is equal to or greater than the predetermined threshold value, detecting appearance of an attack and identifying at least one of an attacking device or an infected device, or a combination thereof based on the profiles.

9. An attack detection method based on measurement of networking behavior abnormalities in symbolic spaces, comprising:

creating profiles based on a transmission address of a flow received from a network;

measuring a behavior abnormality of a device corresponding to the transmission address of the flow on the network, and mapping the measured behavior abnormality to behavior symbols in symbolic spaces;

generating a behavior symbol sequence pattern, in which the behavior symbols are sequentially connected, for each profile; and detecting presence or non-presence of an attack and a device associated with the attack based on an output of the abnormal behavior prediction model that receives the behavior symbol sequence pattern as input, wherein mapping the measured behavior abnormality comprises:

generating a behavior period symbol and a behavior frequency symbol based on a flow size, a flow duration, and an inter-flow arrival time difference (IFTD); and generating a behavior periodicity symbol by combining the behavior period symbol with the behavior frequency symbol.

10. The attack detection method of claim 9, wherein:

the behavior abnormality includes, as a measurement indicator thereof, at least one of behavior periodicity, behavior familiarity, or behavior entropy or a combination thereof, and mapping the measured behavior abnormality further comprises:

mapping each of the behavior periodicity, the behavior familiarity, and the behavior entropy to a behavior symbol in a symbolic space.

11. The attack detection method of claim 10, wherein mapping the measured behavior abnormality further comprises:

measuring behavior familiarity depending on whether at least one key value extracted from the flow is present in a network familiarity model dictionary; and mapping the measured behavior familiarity to a symbol, wherein the network familiarity model is created in advance based on a network flow dataset in a normal state.

12. The attack detection method of claim 10, wherein mapping the measured behavior abnormality further comprises:

measuring a port scanning entropy and a target scanning entropy;

mapping the port scanning entropy and the target scanning entropy to respective symbols; and generating an entropy symbol by combining the two mapped symbols with each other.

13. The attack detection method of claim 10, wherein generating the behavior symbol sequence pattern comprises:

generating a three-dimensional (3D) behavior symbol by combining a behavior periodicity symbol, a behavior familiarity symbol, and a behavior entropy symbol with each other; and adding the generated 3D behavior symbol to a behavior symbol sequence pattern of the corresponding profile.

14. The attack detection method of claim 9, wherein the abnormal behavior prediction model is pre-trained based on a training dataset in which the behavior symbol sequence pattern for each profile is labeled with a normal state or an abnormal state.

15. The attack detection method of claim 9, wherein detecting the presence or non-presence of the attack and the device comprises:

preprocessing the behavior symbol sequence pattern as input data of the abnormal behavior prediction model, and wherein preprocessing comprises:

converting the behavior symbol sequence pattern into a number list;

padding the converted behavior symbol sequence pattern with zero such that a length of the converted behavior symbol sequence pattern becomes equal to that of a behavior symbol sequence pattern used as training data of the abnormal behavior prediction model; and embedding a word in a zero-padded behavior symbol sequence pattern and converting a word-embedded behavior symbol sequence pattern into an input data format of the abnormal behavior prediction model.

16. The attack detection method of claim 9, wherein detecting the presence or non-presence of the attack and the device comprises:
acquiring a score from the abnormal behavior prediction model to which the behavior symbol sequence pattern is input;
determining whether the score is equal to or greater than a predetermined threshold value; and
when it is determined that the score is equal to or greater than the predetermined threshold value, detecting appearance of an attack and identifying at least one of an attacking device or an infected device, or a combination thereof based on the profiles.

17. A model training method for attack detection based on measurement of networking behavior abnormalities in symbolic spaces, the method comprising:
creating profiles based on a transmission address of a flow received from a network;
measuring a behavior abnormality of a device corresponding to the transmission address of the flow on the network, and mapping the measured behavior abnormality to behavior symbols in symbolic spaces;
generating a behavior symbol sequence pattern, in which the behavior symbols are sequentially connected, for each profile;
generating a training dataset in which the behavior symbol sequence pattern for each profile is labeled with a normal state or an abnormal state; and
training an abnormal behavior prediction model with the training dataset,
wherein mapping the measured behavior abnormality comprises:
generating a behavior period symbol and a behavior frequency symbol based on a flow size, a flow duration, and an inter-flow arrival time difference (IFTD); and
generating a behavior periodicity symbol by combining the behavior period symbol with the behavior frequency symbol.

18. The model training method of claim 17, wherein training the abnormal behavior prediction model comprises:
preprocessing the behavior symbol sequence pattern as input data of the abnormal behavior prediction model, and
wherein preprocessing comprises:
converting the behavior symbol sequence pattern into a number list;
padding the converted behavior symbol sequence pattern with zero such that a length of the converted behavior symbol sequence pattern becomes equal to that of a maximum behavior symbol sequence pattern; and
embedding a word in a zero-padded behavior symbol sequence pattern and converting a word-embedded behavior symbol sequence pattern into an input data format of the abnormal behavior prediction model.

* * * * *